United States Patent
Yang et al.

(10) Patent No.: US 11,911,902 B2
(45) Date of Patent: Feb. 27, 2024

(54) METHOD FOR OBSTACLE AVOIDANCE IN DEGRADED ENVIRONMENTS OF ROBOTS BASED ON INTRINSIC PLASTICITY OF SNN

(71) Applicant: DALIAN UNIVERSITY OF TECHNOLOGY, Liaoning (CN)

(72) Inventors: Xin Yang, Liaoning (CN); Jianchuan Ding, Liaoning (CN); Bo Dong, Liaoning (CN); Felix Heide, Liaoning (CN); Baocai Yin, Liaoning (CN)

(73) Assignee: DALIAN UNIVERSITY OF TECHNOLOGY, Dalian (CN)

( * ) Notice: Subject to any disclaimer, the term of this patent is extended or adjusted under 35 U.S.C. 154(b) by 268 days.

(21) Appl. No.: 17/556,578

(22) Filed: Dec. 20, 2021

(65) Prior Publication Data
US 2023/0166397 A1    Jun. 1, 2023

(30) Foreign Application Priority Data
Oct. 21, 2021 (CN) .......................... 202111230061.3

(51) Int. Cl.
*B25J 9/16*    (2006.01)

(52) U.S. Cl.
CPC .............. *B25J 9/161* (2013.01); *B25J 9/163* (2013.01); *B25J 9/1666* (2013.01); *B25J 9/1671* (2013.01)

(58) Field of Classification Search
CPC . B25J 9/161; B25J 9/163; B25J 9/1666; B25J 9/1671
See application file for complete search history.

(56) References Cited

U.S. PATENT DOCUMENTS

| | | | | |
|---|---|---|---|---|
| 8,990,133 | B1* | 3/2015 | Ponulak | G06N 3/08 706/25 |
| 9,542,643 | B2* | 1/2017 | Levin | G06N 3/049 |
| 2014/0379624 | A1* | 12/2014 | Piekniewski | G06N 3/049 706/15 |
| 2015/0269482 | A1* | 9/2015 | Annapureddy | G06N 3/049 706/25 |
| 2017/0001309 | A1* | 1/2017 | Passot | G05D 1/0221 |
| 2022/0058480 | A1* | 2/2022 | Park | G06N 3/049 |

\* cited by examiner

*Primary Examiner* — Kira Nguyen
(74) *Attorney, Agent, or Firm* — MUNCY, GEISSLER, OLDS & LOWE, P.C.

(57) ABSTRACT

A method for obstacle avoidance in degraded environments of robots based on intrinsic plasticity of an SNN is disclosed. A decision network in a synaptic autonomous learning module takes lidar data, distance from a target point and velocity at a previous moment as state input, and outputs the velocity of left and right wheels of the robot through the autonomous adjustment of the dynamic energy-time threshold, so as to carry out autonomous perception and decision making. The method solves the difficulty of the lack of intrinsic plasticity in the SNN, which leads to the difficulty of adapting to degraded environments due to the homeostasis imbalance of the model, is successfully deployed in mobile robots to maintain a stable trigger rate for autonomous navigation and obstacle avoidance in degraded, disturbed and noisy environments, and has validity and applicability on different degraded scenes.

1 Claim, 8 Drawing Sheets

Experimental results of average trigger rate of LIF model

Variance experimental results of average trigger rate of LIF model

Variance experimental results of variance of average trigger rate of LIF model

Experimental results of average trigger rate of SRM model

Variance experimental results of average trigger rate of SRM model

Variance experimental results of variance of average trigger rate of SRM model

METHOD FOR OBSTACLE AVOIDANCE IN DEGRADED ENVIRONMENTS OF ROBOTS BASED ON INTRINSIC PLASTICITY OF SNN

TECHNICAL FIELD

The present invention belongs to the field of brain-like robots in the field of brain-like intelligence, specifically relates to autonomous navigation and obstacle avoidance of the brain-like robots, and particularly relates to a method for obstacle avoidance in degraded environments with intrinsic plasticity homeostasis of spiking neurons.

BACKGROUND

The obstacle avoidance task of the robot means that the robot can navigate to a target point autonomously without any collision with the obstacle in a relatively complex scene, which has great practical application value. With the rapid development of artificial intelligence technology, obstacle avoidance-related tasks of the robot, such as sweeping robots, unmanned driving, smart warehouses and smart logistics, have achieved significant performance improvement.

Although some methods based on artificial neural networks have been successfully applied to the obstacle avoidance tasks, their high energy consumption limits their large-scale use in the field of the robots. As the third generation of artificial neural networks, a spiking neural network (SNN) has the characteristics of time continuity, high energy efficiency, fast processing and biological rationality, making its combination with the obstacle avoidance tasks more widespread and reasonable.

However, most of existing SNNs focus only on synaptic plasticity between neurons and ignore the intrinsic plasticity of the neurons, i.e. they only focus on the updating of synaptic weight while using membrane-related parameters as hyperparameters, which may affect the ability of the neurons to maintain the intrinsic homeostasis, thereby limiting the diversity of the neurons and the expressive capacity of the model. The behavior of the intrinsic plasticity is found in brain regions of many species, and the intrinsic plasticity has been proved to be critical in shaping the dynamics of neural circuits, which can control excitability and homeostasis of the neurons to maintain maximal activity throughout the neural network. Thus, simply ignoring the intrinsic plasticity in the SNNs may disrupt the homeostasis inside the neurons, thereby limiting the expressive capacity of the SNNs.

At present, research in the application of the intrinsic plasticity is still in an initial stage, and the existing methods have some shortcomings, such as simple model structures, fixed parameters and no biological inspiration, which make it difficult to use the intrinsic plasticity homeostasis. Replacing commonly used threshold hyperparameters with dynamic spike triggering thresholds observed in biology is one way for maintaining homeostasis of intrinsic neuronal plasticity. However, there has been no work that applies dynamic spike thresholds with a bio-theoretical background to practical tasks based on SNNs, so designing biologically inspired models of intrinsic plasticity homeostasis is an urgent task in the field of biological brain-like robots.

Therefore, based on the investigation and analysis of the existing spike models, the present invention designs a biologically reasonable dynamic energy-time threshold (BDETT) to achieve intrinsic plasticity of neurons to maintain the homeostasis of the network and maximize its activity. This threshold includes a dynamic energy threshold and a dynamic time threshold. The former maintains global homeostasis, and the latter focuses on local attention. Both of the two thresholds are integrated while maintaining the homeostasis of the model. The validity of the model is verified by an obstacle avoidance navigation task with the brain-like robot. The input of the method is the data from a lidar rangefinder mounted on the robot platform and the output is the action to be taken by the robot, including linear velocity and angular velocity. The method can effectively adapt to different degraded environments to allow the brain-like robot to maintain efficient obstacle avoidance navigation decisions in scenes with interference and hard noise, thereby assisting in bridging the gap between the fields of biology and machine learning.

SUMMARY

The purpose of the present invention is to realize a method for obstacle avoidance for a robot in degraded environments by designing biologically reasonable dynamic thresholds for intrinsic plasticity homeostasis of an SNN. The method comprises a dynamic energy threshold module, a dynamic time threshold module, a biologically reasonable dynamic energy-time threshold fusion module, and a synaptic scene building and autonomous learning module.

The technical solution of the present invention is as follows:

A method for obstacle avoidance in degraded environments of robots based on intrinsic plasticity of an SNN comprises the following steps:

Step 1: dynamic energy threshold module

A basic SNN model is mainly composed of membrane potential, weight connection, trigger thresholds, and trigger spikes. The present invention mainly improves the trigger thresholds in the SNN and comprises: replacing an original static trigger threshold by a biologically explainable dynamic trigger threshold and correlating the dynamic trigger threshold with the membrane potential to realize the intrinsic plasticity homeostasis of the model; specifically designing a dynamic energy threshold according to a positive correlation phenomenon observed in biology between the dynamic threshold and a mean membrane potential; calculating the dynamic energy threshold $E_i^l(t)$ for each neuron at a current moment according to the membrane potential of each neuron at the current moment, the membrane potential of all neurons in the same layer, and the trigger threshold of all the neurons in the same layer, with specific modes as shown in formulas (1-4):

$$E_i^l(t) = \eta(v_i^l(t) - V_m^l(t)) + V_\theta^l(t) + \ln\left(1 + e^{\frac{v_i^l(t) - V_m^l(t)}{\psi^l(t)}}\right) \quad (1)$$

$$V_m^l(t) = \mu(v_i^l(t)) - 0.2(\max(v_i^l(t)) - \min(v_i^l(t))) \text{ for } i = 1, 2, \ldots, N^l \quad (2)$$

$$V_\theta^l(t) = \mu(\Theta_i^l(t)) - 0.2(\max(\Theta_i^l(t)) - \min(\theta_i^l(t))) \text{ for } i = 1, 2, \ldots, N^l \quad (3)$$

$$\psi^l(t) = \left|\frac{\sigma(v_i^l(t))}{\mu(v_i^l(t))}\right| \text{ for } i = 1, 2, \ldots, N^l \quad (4)$$

where $N^l$ is the number of the neurons in a layer l; $\eta$ is a slope hyperparameter, set to 0.2; $v_i^l(t)$ is the value of the membrane potential of the neuron i in the layer l at moment t; $\mu(\cdot)$ is mean value operation; $\sigma(\cdot)$ is standard deviation operation; $\Theta_i^l(t)$ is the trigger threshold of the neuron i in the layer l at moment t; $V_m^l(t)$ and $V_\theta^l(t)$ are index values of relationships between the layers, and are specifically the differences of the mean value of all the neurons in the same layer from maximum and minimum ranges, to enhance potential coupling and sensitivity of each neuron and other neurons in the same layers; $\psi^l(t)$ is a coefficient of variation of all the neurons in the same layer to encode potential fluctuation between the layers, since the coefficient of variation can be used to describe the distribution of the membrane potential relative to the mean value of the potential. Thus, slower voltage fluctuation may result in lower coefficient of variation, which provides a steeper slope. The threshold rises faster with the increase of the current membrane potential and makes the neurons less sensitive to the potential that change less. At the same time, as the potential fluctuates rapidly, the dynamic energy threshold is more sensitive to the current potential by reducing the steepness of the slope.

Step 2: dynamic time threshold module designing a dynamic time threshold according to a negative correlation phenomenon observed in biology between the dynamic threshold and a previous depolarization rate; calculating the dynamic time threshold $\Gamma_i^l(t+1)$ for each neuron at the current moment according to the membrane potential of each neuron at the current moment and the previous moment, the depolarization rate, and the trigger threshold of all the neurons in the same layer, with specific modes as shown in formulas (5-6):

$$\Gamma_i^l(t+1) = a + e^{\frac{-(v_i^l(t+1) - v_i^l(t))}{\psi^l(t+1)}} \quad (5)$$

$$a = e^{-|\mu(\Theta_i^l(t))|} \text{ for } i = 1, 2, \ldots, N^l \quad (6)$$

$v_i^l(t)$ and $v_i^l(t+1)$ are the values of the membrane potentials of the neuron i in the layer l at moment t and moment t+1 respectively; $\Gamma_i^l(t+1)$ is a single exponential function as a whole, where a is an exponential decay function with a decay rate which is based on the mean value of the dynamic thresholds of all the neurons in a previous time stamp t in the layer l; a threshold relationship between the layers is used to enhance the coupling connection between a single neuron and a whole, so that the higher the depolarization of the membrane potential is, the faster the time threshold decreases; the coefficient of variation $\psi^l(t+1)$ is also used to dynamically adjust the sensitivity of the time threshold to layered potential fluctuation; when the layered potential fluctuation is lower, the time threshold is more sensitive to the previous depolarization rate, and vice versa.

Step 3: biologically reasonable dynamic energy-time threshold fusion module after obtaining two thresholds through step 1 and step 2, obtaining a final dynamic energy-time threshold $\Theta_i^l(t+1)$ by fusing, with a specific mode as shown in formula (7):

$$\Theta_i^l(t+1) = \frac{1}{2}\left(E_i^l(t) + \Gamma_i^l(t+1)\right) \quad (7)$$

obtaining $E_i^l(t)$ at the moment t by the dynamic energy threshold module to ensure a positive correlation relationship between the dynamic threshold and the mean membrane potential; obtaining $\Gamma_i^l(t+1)$ at the moment t+1 by the dynamic time threshold module to ensure a negative correlation relationship between the dynamic threshold and the depolarization rate; obtaining the final dynamic energy-time threshold $\Theta_i^l(t+1)$ by mean superposition, and deploying the threshold in the SNN to replace a basic static threshold, to form a dynamic threshold spiking model and exhibit the intrinsic plasticity homeostasis of the model;

Step 4: synaptic scene building and autonomous learning module after obtaining the dynamic energy-time threshold $\Theta_i^l(t+1)$ through step 3, applying the threshold to Leaky Integrate-and-Fire neuron; after the membrane potential reaches the threshold, triggering a spike and transmitting the spike to a next layer to form a dynamic threshold spiking model; to solve an obstacle avoidance problem in a degraded scene, firstly building a training test simulation environment; using a URDF model of a TurtleBot-ROS robot as an experimental robot, equipped with 2D lidar and odometer sensors for sensing the environment to form a robot model; importing the robot model into a ROS-Gazebo simulator, and building a plurality of training environments with increasing difficulty in the simulator by using a static Block obstacle to complete the training in different scenes and phases; manually adding dynamic obstacles in the ROS-Gazebo as the test scenes in degraded environments to test the validity of a spiking homeostasis model; then, embedding the dynamic threshold spiking model into a deep reinforcement learning framework DDPG to replace an Actor network for decision making in the form of spikes and autonomous trial and error learning of synaptic weight; wherein the input of a decision network comprises 18-dimensional lidar data, 3-dimensional velocity information, and 3-dimensional distance information, i.e., 24-dimensional state information; making an action decision through a 4-layer fully connected layer with a network structure of 24-256-256-256-2; final two actions representing the velocity of left and right wheels of the robot respectively, so as to conduct autonomous sensing and decision making; after training the dynamic threshold spiking model, in the environment of the ROS-Gazebo, manually adding noise interference to form a degraded environment; achieving the intrinsic plasticity homeostasis of the neurons by the dynamic threshold spiking model through the autonomous adjustment of the dynamic energy-time threshold; and keeping a stable trigger rate under degradation, interference and emergency situations, thereby completing autonomous obstacle avoidance and navigation of a brain-like robot.

The present invention has the following beneficial effects:

(1) Obstacle Avoidance Test Results and Efficiency

The present invention solves the difficulty of the lack of intrinsic plasticity in the SNN, which leads to the difficulty of adapting to degraded environments due to the homeostasis imbalance of the model, and is successfully deployed in mobile robots to maintain a stable trigger rate for autonomous navigation and obstacle avoidance in degraded, disturbed and noisy environments.

The present invention proposes a novel biologically explainable dynamic energy-time threshold method that bridges the gap between biological research and machine learning on intrinsic plasticity homeostasis. Robustness is verified in robot obstacle avoidance tasks under different realistic degradation conditions and the validity of the method is demonstrated through comparison experiments. Models with higher homeostasis can better adapt to different degradation conditions, thereby greatly increasing the success rate. The method achieves the best performance in the comparison experiments in terms of the two commonly used metrics of the average success rate and average time taken, while maintaining the most stable average trigger rate in the homeostasis evaluation metrics and having a significant advantage in degraded environments.

(2) Broad Applicability

The present invention is applied to obstacle avoidance and navigation tasks of the brain-like robots in different spiking neuron models as well as in different degraded scenes: (a) test scenes with dynamic obstacles for static training models; (b) test scenes where the state inputs of the models have Gaussian interference noise (0, 1.0); (c) test scenes where the synaptic weight connection of the models has Gaussian noise (0, 0.05). The validity and applicability of the method in different degraded scenes are proved.

DESCRIPTION OF DRAWINGS

FIGS. 4(a) to 4(f) the homeostasis results of experiments implemented in the present invention. Wherein FIG. 4(a) shows the experimental results of the average trigger rate of the LIF model, FIG. 4(b) shows the variance experimental results of the average trigger rate of the LIF model, FIG. 4(c) shows the variance experimental results of the variance of the average trigger rate of the LIF model, FIG. 4(d) shows the experimental results of the average trigger rate of the SRM model, FIG. 4(e) shows the variance experimental results of the average trigger rate of the SRM model, and FIG. 4(f) shows the variance experimental results of the variance of the average trigger rate of the SRM model. The test scenes for each experimental result are successively degraded environments with 0.2 state interference, 0.6 state interference, Gaussian noise state interference, 8-bit Loihi weigh, Gaussian noise weight, and 30% zero weight in the clockwise sector starting from 12 o'clock of a polar coordinate disc. The comparison test models are successively SDDPG, continuous SDDPG, Hao model, Kim model, dynamic energy threshold model, dynamic time threshold model, and dynamic energy-time threshold model in clockwise direction within each sector.

DETAILED DESCRIPTION

Specific embodiments of the present invention are further described below in combination with accompanying drawings and the technical solution.

The method uses LIF and SRM neuron models as the main neuronal structures of the network and DDPG as the framework for deep reinforcement learning. The states comprise lidar data, the distance to the target point and the velocity at the previous moment; the action is composed of linear velocity and angular velocity of the brain-like robot; the reward function contains the state of the distance to the target at each moment (positive reward if closer, and vice versa), and minus 20 if a collision occurs and plus 30 if it reaches the target point. The robot is encouraged not to take too large an action at each step, i.e. not to exceed 1.7 times the angular velocity at the previous moment.

The reinforcement learning algorithm is implemented in Pytorch. Stochastic gradient descent is used for the reinforcement learning network with a momentum value of 0.9, a weight decay of 1e-4, a learning rate of 1e-5, a decay factor of 0.99, a maximum step size of 150 and a batch size of 256. In the embodiments of the present invention, the learning process is terminated after 2,000,000 training paths, and it takes approximately 25 hours to train the strategy on a computer equipped with an i7-7700 CPU and an NVIDIA GTX 1080Ti GPU. To verify the validity of the network, the network is compared with the SDDPG, as a method without intrinsic plasticity, and the Hao and Kim models, as methods with heuristic intrinsic plasticity, to verify the validity of the present invention. Ablation experiments are also performed on all the modules proposed in the model to prove the validity of each part.

Figure 1:
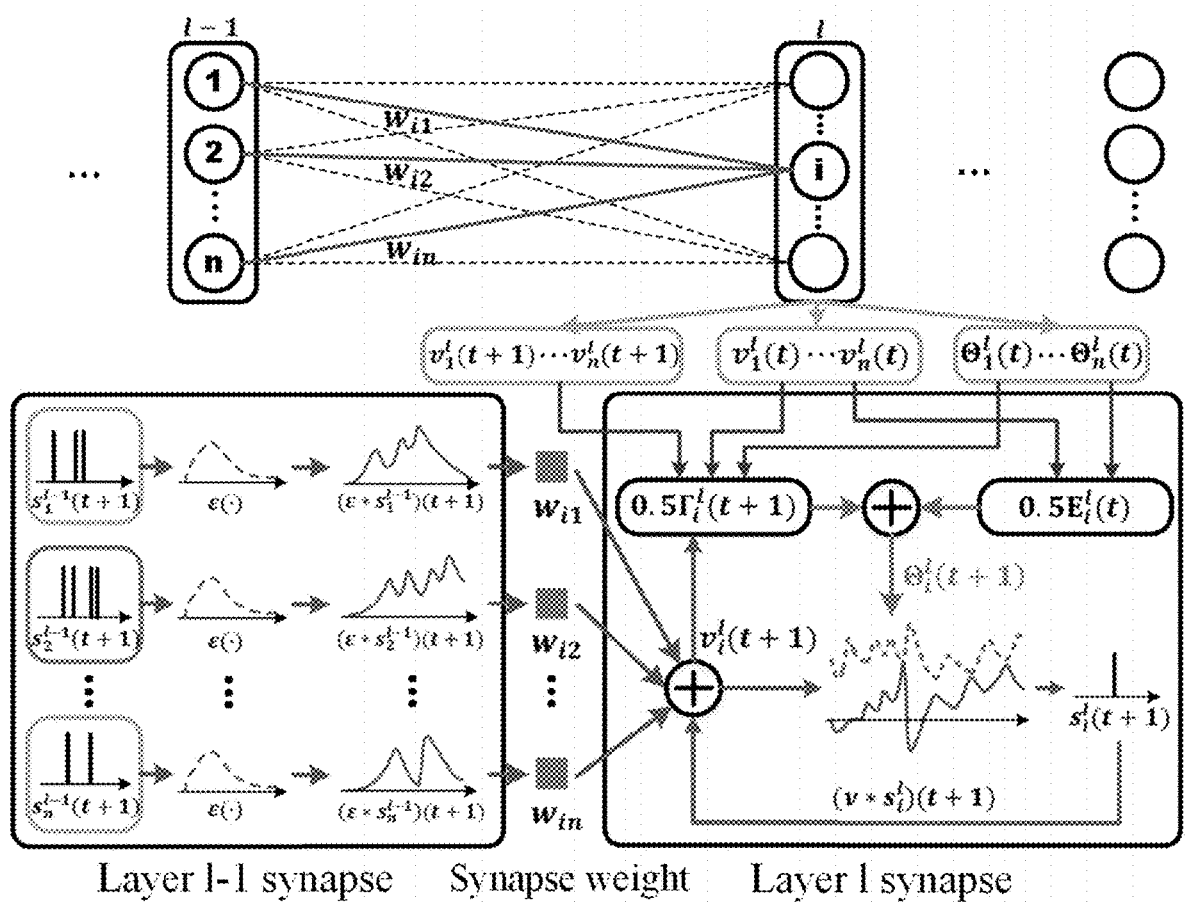
FIG. 1 shows the structure of a network model of the present invention.

FIG. 1 shows the structure of a biologically reasonable dynamic energy-time threshold network model. The entire structure is visualization of the dynamic threshold generation process for the neuron i in the layer l at moment t+1, and is calculated from the membrane potential of each neuron at the current moment, the membrane potential of all neurons in the same layer, the membrane potential of each neuron at the current moment and the previous moment, the depolarization rate and the trigger threshold of all neurons in the same layer.

Figure 2:
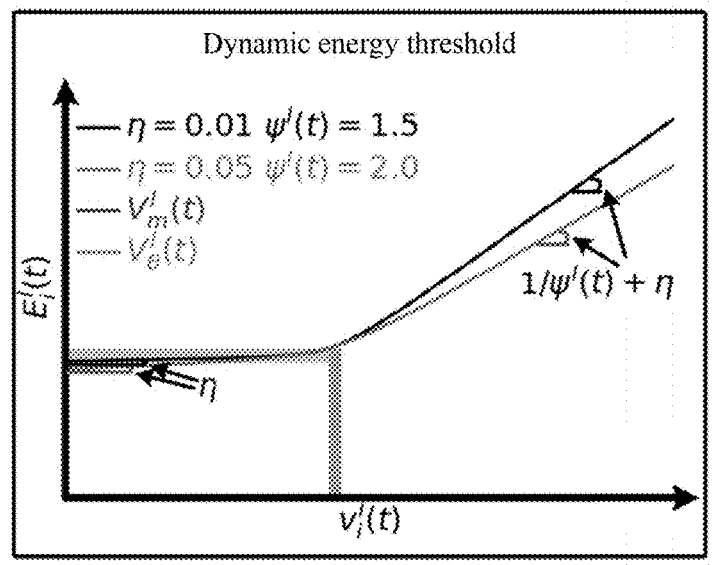
FIG. 2 is a schematic diagram of a dynamic energy threshold module of the present invention.

FIG. 2 is a schematic diagram of a model curve of a dynamic energy threshold module. When the membrane potential $v_i^l(t)$ is less than $V_m^l(t)$, the slope of the function is small and the threshold is dominated by $V_\theta^l(t)$. In the opposite case, the energy threshold has a higher slope to suppress the higher spike emissivity.

Figure 3:
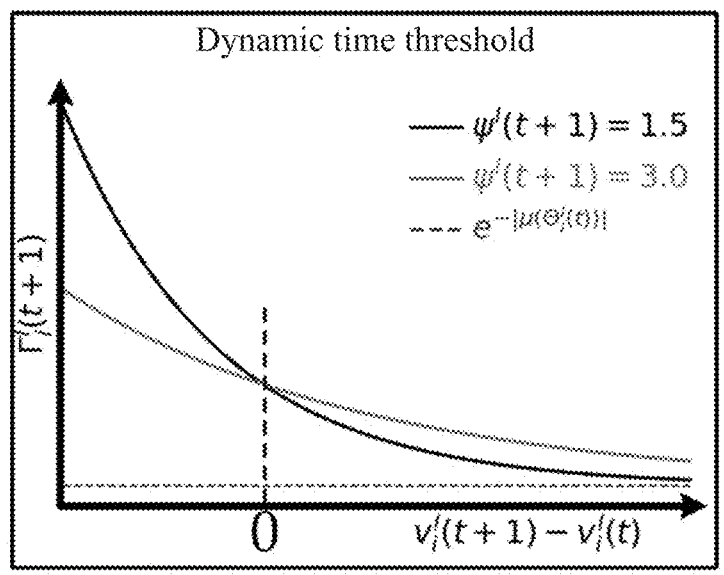
FIG. 3 is a schematic diagram of a dynamic time threshold module of the present invention.

FIG. 3 is a schematic diagram of a model curve of a dynamic time threshold module. Compared with the larger $\psi^l(t+1)$, lower $\psi^l(t+1)$ provides a steeper slope of descent. This means that when the layered membrane potential fluctuates less, the dynamic time threshold is more sensitive to the previous depolarization rate and vice versa.

Figure 4A:
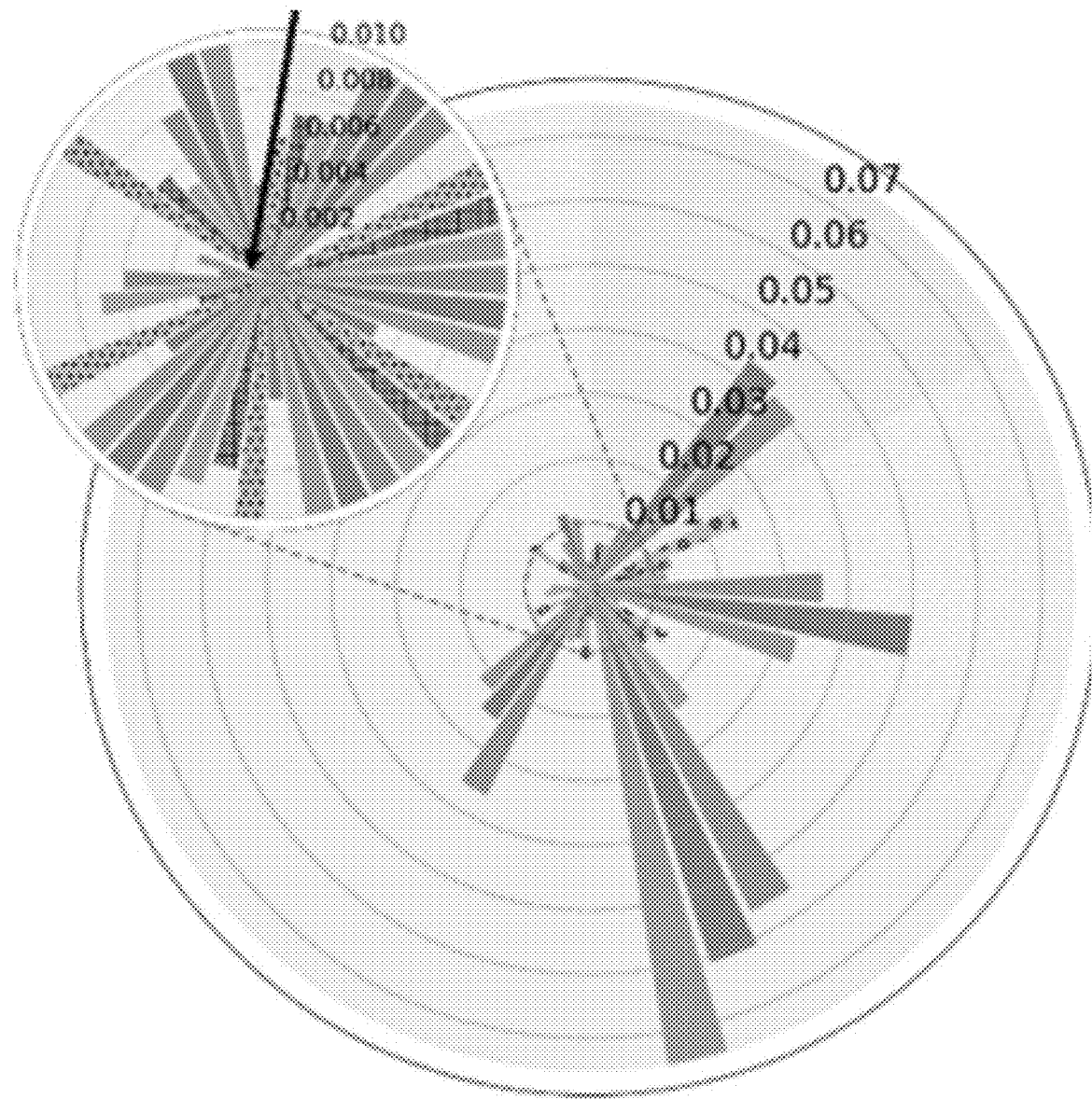
Figure 4B:
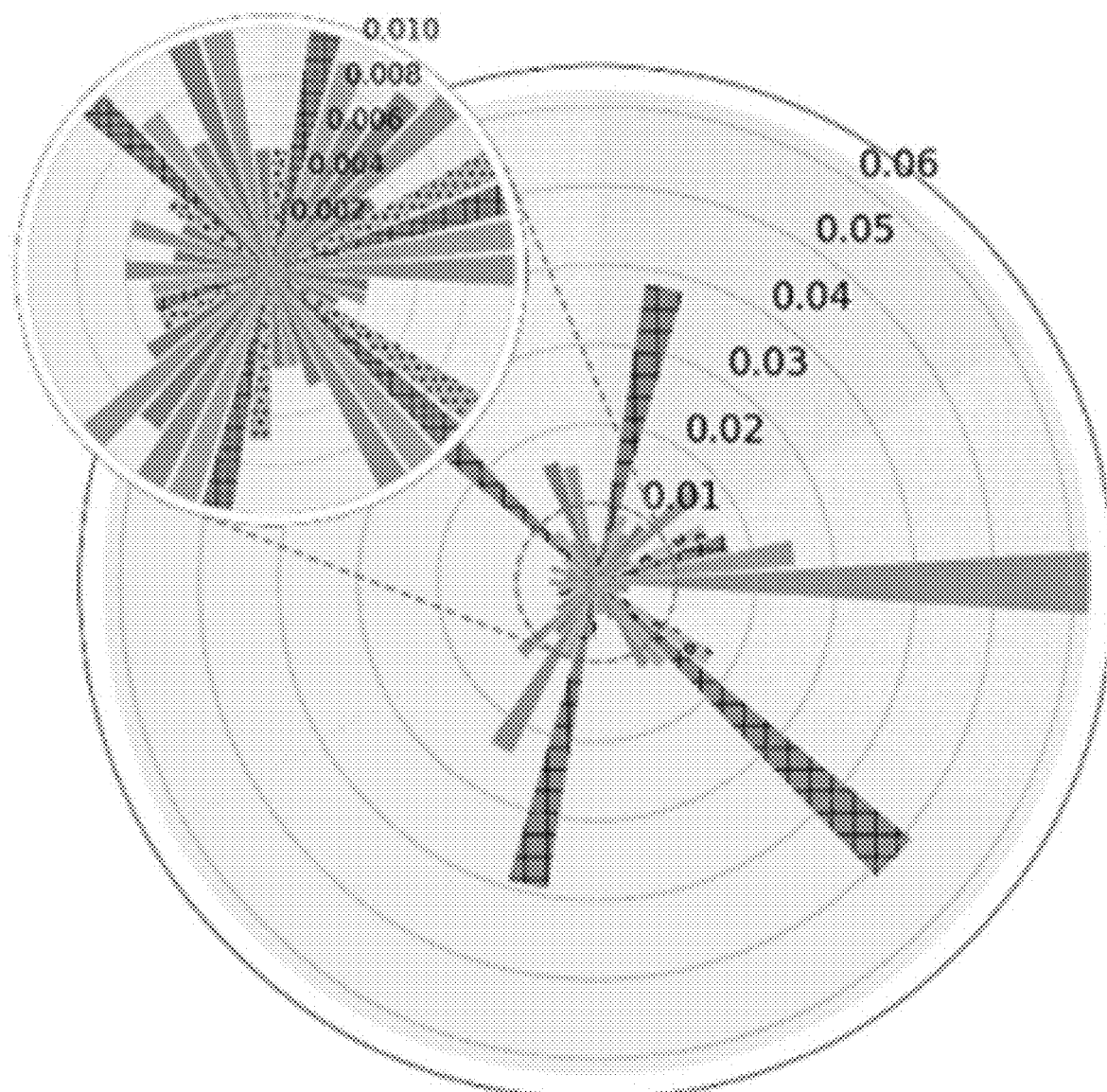
Figure 4C:
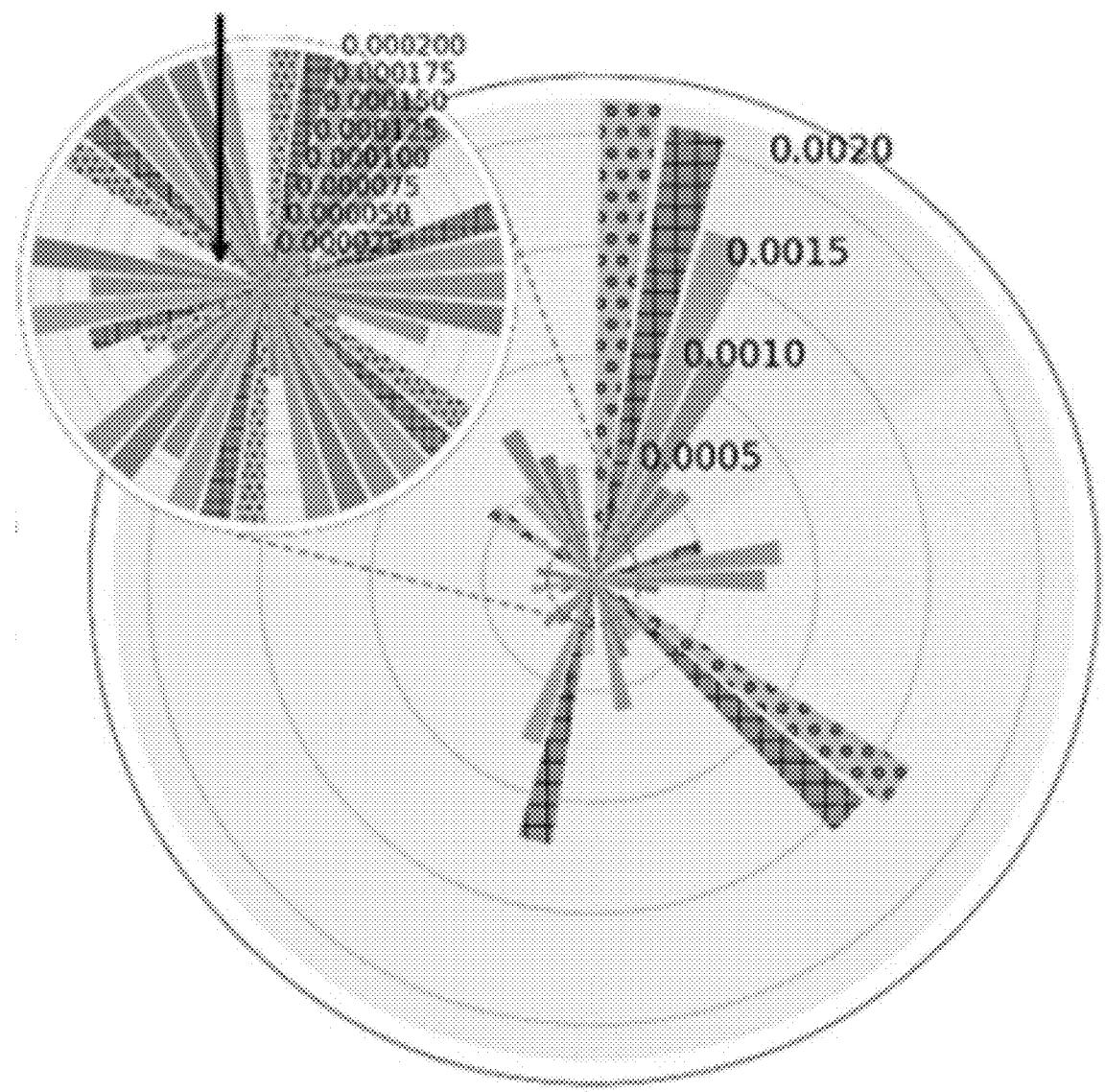
Figure 4D:
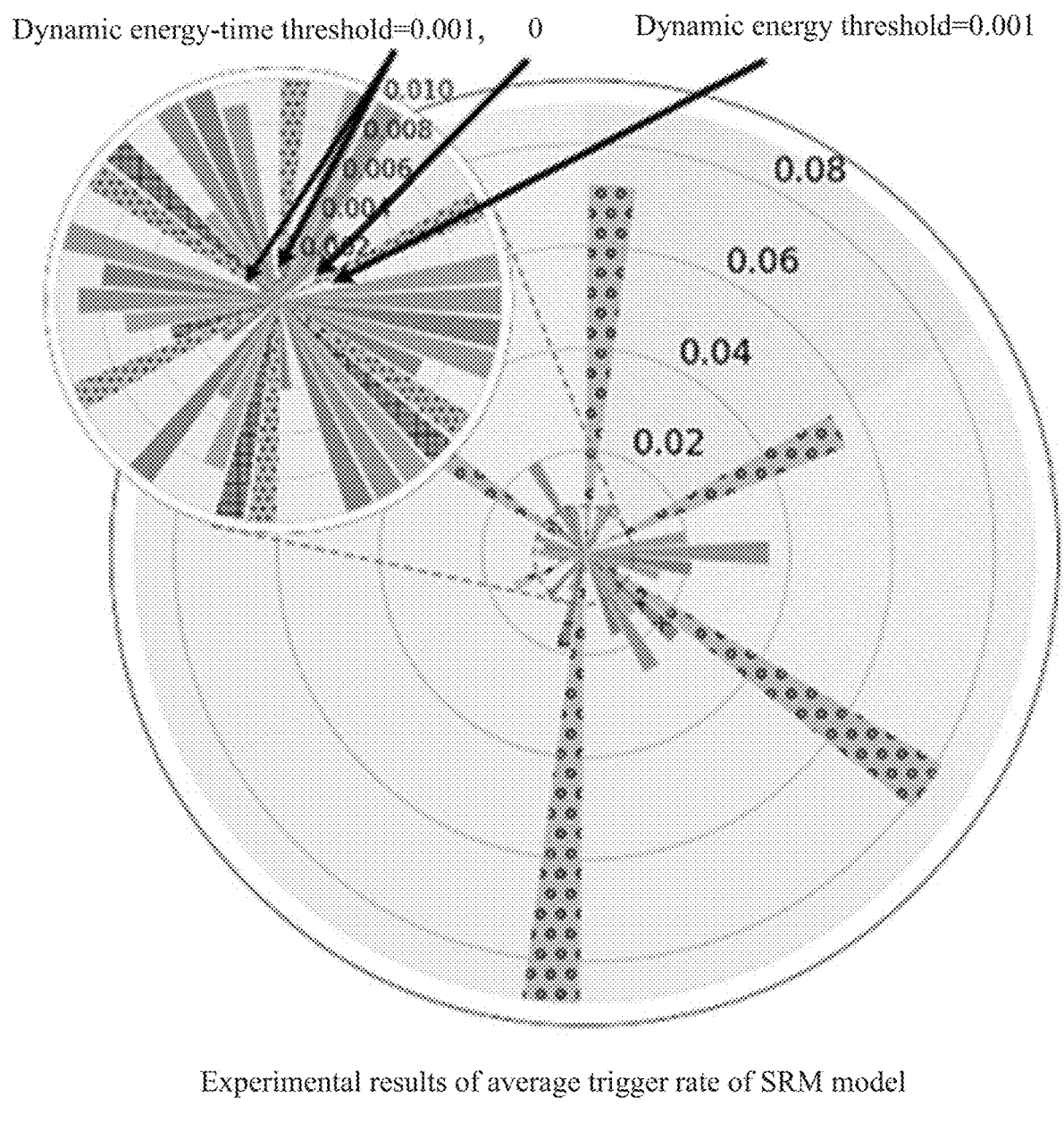
Figure 4E:
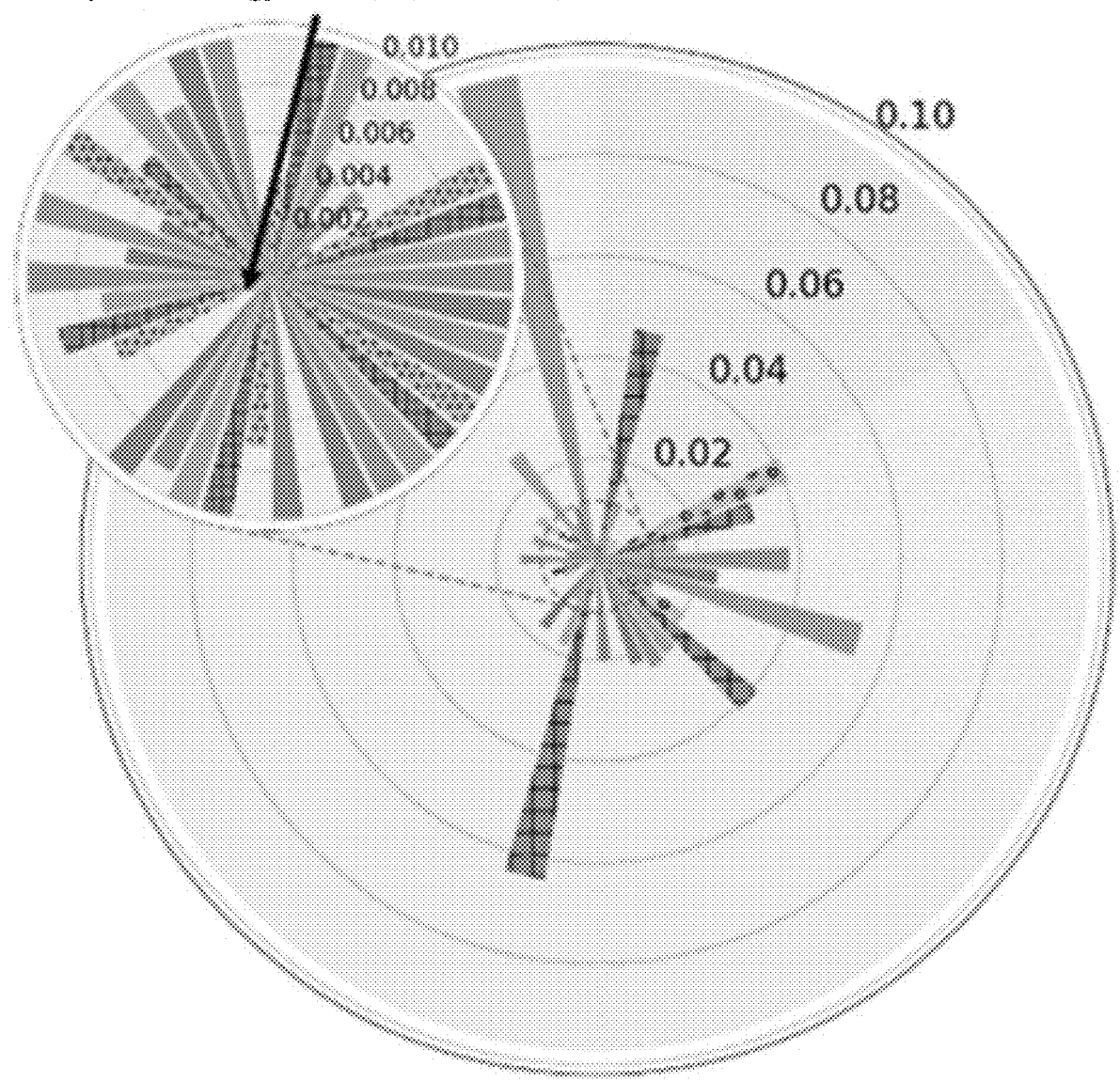
Figure 4F:
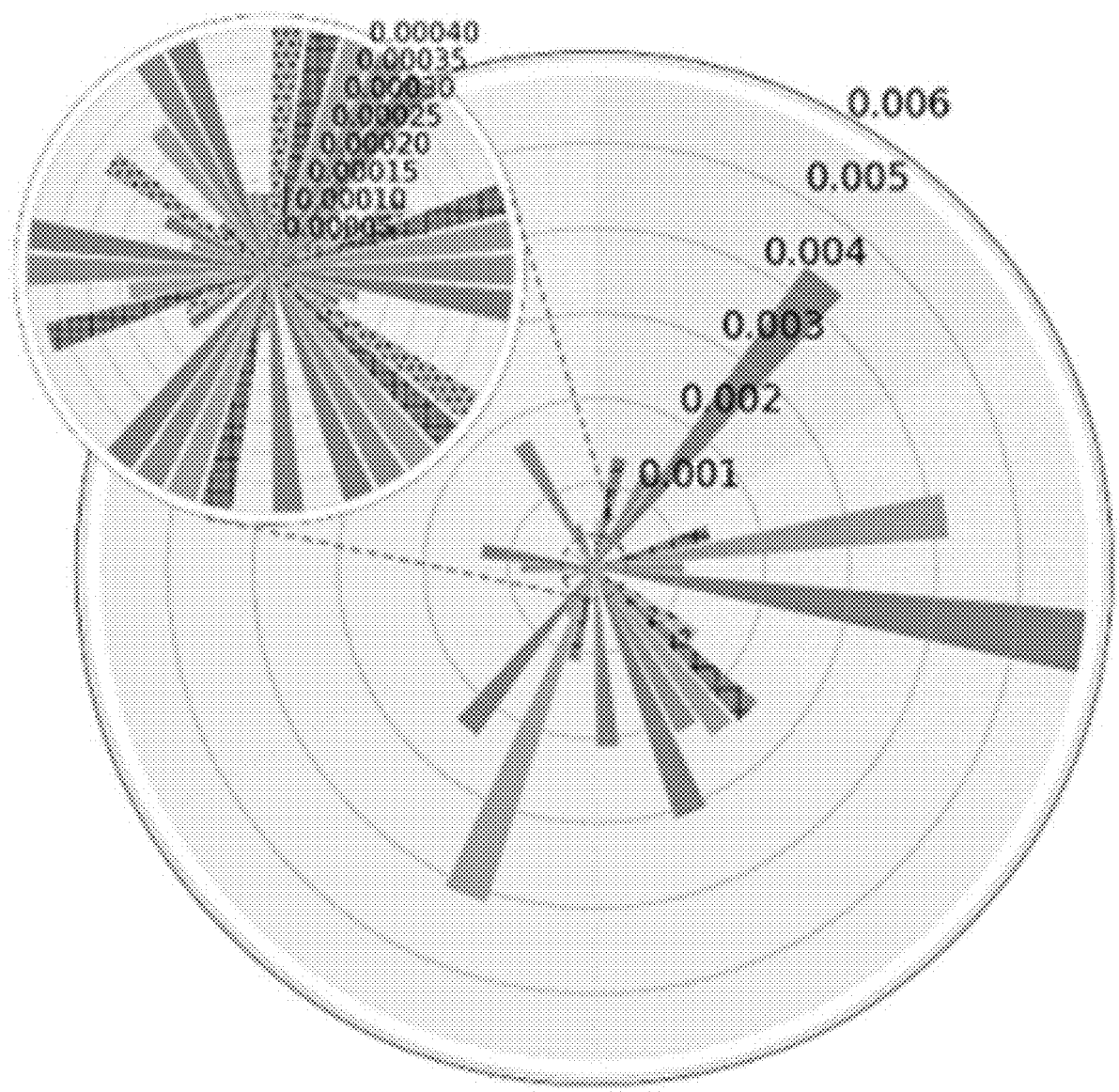

FIG. 4 is a homeostasis variation diagram of model emissivity during obstacle avoidance for the brain-like robot, wherein FIGS. 4(a) to 4(c) are the test results for the LIF neuron model and FIGS. 4(d) to 4(f) are the test results for the SRM neuron model. The test scenes include 0.2 state interference, 0.6 state interference, Gaussian noise state interference, 8-bit Loihi weight, Gaussian noise weight, and a degraded environment with 30% zero weight. In the scenes, the success rate of obstacle avoidance and navigation of the brain-like robot is tested, and the results show that the biologically reasonable dynamic energy-time threshold with stronger dynamic balance produce smaller changes in all three metrics when moving from one situation to another, realizing intrinsic plasticity homeostasis and thus achieving higher success rate.

The invention claimed is:

1. A method for obstacle avoidance in degraded environments of robots based on intrinsic plasticity of a spiking neural network (SNN), comprising the following steps:

step 1: dynamic energy threshold module improving a trigger threshold in the SNN by the method; replacing an original static trigger threshold by a biologically explainable dynamic trigger threshold and correlating the dynamic trigger threshold with a membrane potential to realize the intrinsic plasticity homeostasis of the SNN; designing a dynamic energy threshold according to positive correlation observed in biology between the dynamic threshold and a mean membrane potential; calculating the dynamic energy threshold $E_i^l(t)$ for each neuron at a current moment according to the membrane potential of each neuron at the current moment, the membrane potential of all neurons in the same layer, and the trigger threshold of all the neurons in the same layer, with specific modes as shown in formulas (1-4):

$$E_i^l(t) = \eta(v_i^l(t) - V_m^l(t)) + V_\theta^l(t) + \ln\left(1 + e^{\frac{v_i^l(t) - V_m^l(t)}{\psi^l(t)}}\right) \quad (1)$$

$$V_m^l(t) = \mu(v_i^l(t)) - 0.2(\max(v_i^l(t)) - \min(v_i^l(t))) \text{ for } i = 1, 2, \ldots, N^l \quad (2)$$

$$V_\theta^l(t) = \mu(\Theta_i^l(t)) - 0.2(\max(\Theta_i^l(t)) - \min(\Theta_i^l(t))) \text{ for } i = 1, 2, \ldots, N^l \quad (3)$$

$$\psi^l(t) = \left|\frac{\sigma(v_i^l(t))}{\mu(v_i^l(t))}\right| \text{ for } i = 1, 2, \ldots, N^l \quad (4)$$

where $N^l$ is the number of the neurons in a layer l, η is a slope hyperparameter, set to 0.2; $v_i^l(t)$ is the value of the membrane potential of the neuron i in the layer l at moment t; μ(•) is mean value operation; σ(•) is standard deviation operation; $\Theta_i^l(t)$ is the trigger threshold of the neuron i in the layer l at moment t; $V_m^l(t)$ and $V_\theta^l(t)$ are index values of relationships between the layers, and are specifically the differences of the mean value of all the neurons in the same layer from maximum and minimum ranges, to enhance potential coupling and sensitivity of each neuron and other neurons in the same layers; $\psi^l(t)$ is a coefficient of variation of all the neurons in the same layer to encode potential fluctuation between the layers, since the coefficient of variation is used to describe the distribution of the membrane potential relative to the mean value of the potential;

step 2: dynamic time threshold module designing a dynamic time threshold according to negative correlation observed in biology between the dynamic threshold and a previous depolarization rate; calculating the dynamic time threshold $\Gamma_i^l(t+1)$ for each neuron at the current moment according to the membrane potential of each neuron at the current moment and the previous moment, the depolarization rate, and the trigger threshold of all the neurons in the same layer, with specific modes as shown in formulas (5-6):

$$\Gamma_i^l(t+1) = a + e^{\frac{-(v_i^l(t+1) - v_i^l(t))}{\psi^l(t+1)}} \quad (5)$$

$$a = e^{-|\mu(\Theta_i^l(t))|} \text{ for } i = 1, 2, \ldots, N^l \quad (6)$$

$v_i^l(t)$ and $v_i^l(t+1)$ are the values of the membrane potentials of the neuron i in the layer l at moment t and moment t+1 respectively; $\Gamma_i^l(t+1)$ is a single exponential function, where a is an exponential decay function with a decay rate which is based on the mean value of the dynamic thresholds of all the neurons in a previous time stamp t in the layer l; a threshold relationship between the layers is used to enhance the coupling connection between a single neuron and a whole, so that the higher the depolarization potential is, the faster the time threshold decreases; the coefficient of variation $\psi^l(t+1)$ is also used to dynamically adjust the sensitivity of the time threshold to layered potential fluctuation; when the layered potential fluctuation is lower, the time threshold is more sensitive to the previous depolarization rate, and vice versa;

step 3: biologically reasonable dynamic energy-time threshold fusion module after obtaining two thresholds through step 1 and step 2, obtaining a final dynamic energy-time threshold $\Theta_i^l(t+1)$ by fusing, with a specific mode as shown in formula (7):

$$\Theta_i^l(t+1) = \frac{1}{2}(E_i^l(t) + \Gamma_i^l(t+1)) \quad (7)$$

obtaining $E_i^l(t)$ at the moment t by the dynamic energy threshold module to ensure a positive correlation relationship between the dynamic threshold and the mean membrane potential; obtaining $\Gamma_i^l(t+1)$ at the moment t+1 by the dynamic time threshold module to ensure a negative correlation relationship between the dynamic threshold and the depolarization rate; obtaining the final dynamic energy-time threshold $\Theta_i^l(t+1)$ by mean superposition, and deploying the threshold in the SNN to replace a basic static threshold, to form a dynamic threshold spiking model and exhibit the intrinsic plasticity homeostasis of the model;

step 4: synaptic scene building and autonomous learning module after obtaining the dynamic energy-time threshold $\Theta_i^l(t+1)$ through step 3, applying the threshold to Leaky Integrate-and-Fire neuron; after the membrane potential reaches the dynamic spiking threshold, triggering a spike and transmitting the spike to a next layer to form a dynamic threshold spiking model; to solve an obstacle avoidance problem in a degraded scene, firstly building a training test simulation environment; using a URDF model of a TurtleBot-ROS robot as an experimental robot, equipped with 2D lidar and odometer sensors for sensing the environment to form a robot model; importing the robot model into a ROS-Gazebo simulator, and building a plurality of training environments with increasing difficulty in the ROS-Gazebo simulator by using a static Block obstacle to complete the training in different scenes and phases; manually adding dynamic obstacles in the ROS-Gazebo simulator as the test scenes in degraded environments to test the validity of a spiking homeostasis model; then, embedding the dynamic threshold spiking model into a deep reinforcement learning framework DDPG to replace an Actor network for decision making in the form of spikes and autonomous trial and error learning of synaptic weight; wherein the input of a decision network comprises 18-dimensional lidar data, 3-dimensional velocity information, and 3-dimensional distance information, i.e., 24-dimensional state information; making an action decision through a 4-layer fully connected layer with a network structure of 24-256-256-256-2; final two actions representing the velocity of left and right wheels of the robot respectively, so as to conduct autonomous sensing and decision making; after training the dynamic threshold spiking model, in the environment of the ROS-Gazebo simulator, manually adding noise interference to form a degraded environment; achieving the intrinsic plasticity homeostasis of the neurons by the dynamic threshold spiking model through the autonomous adjustment of the dynamic energy-time threshold; and keeping a stable trigger rate under degradation, interference and emergency situations, thereby completing autonomous obstacle avoidance and navigation of a brain-like robot.

* * * * *